United States Patent [19]

Chyung et al.

[11] Patent Number: 4,846,866

[45] Date of Patent: * Jul. 11, 1989

[54] PROVIDING REINFORCED ALKALINE EARTH ALUMINOSILICATE GLASSES

[75] Inventors: Kenneth Chyung; Kishor P. Gadkaree; Mark P. Taylor, all of Painted Post, N.Y.

[73] Assignee: Corning Glass Works, Corning, N.Y.

[*] Notice: The portion of the term of this patent subsequent to Oct. 7, 2003 has been disclaimed.

[21] Appl. No.: 132,366

[22] Filed: Dec. 14, 1987

Related U.S. Application Data

[60] Continuation of Ser. No. 904,472, Sep. 8, 1986, abandoned, which is a division of Ser. No. 723,634, Apr. 15, 1985, Pat. No. 4,626,515.

[51] Int. Cl.$^4$ .................. C03B 19/06; C03B 19/09
[52] U.S. Cl. .................. 65/18.3; 65/18.1; 65/3.2; 264/60; 264/125
[58] Field of Search .................. 65/3.2, 18.1, 18.2, 65/18.3, 60.53; 501/88, 89, 95, 32; 264/60, 125

[56] References Cited

U.S. PATENT DOCUMENTS

| | | | |
|---|---|---|---|
| 4,314,852 | 2/1982 | Brennan | 501/89 X |
| 4,428,763 | 1/1984 | Layden | 501/95 |
| 4,463,058 | 7/1984 | Hood | 501/88 X |
| 4,464,192 | 8/1984 | Layden | 65/3.2 |
| 4,521,360 | 6/1985 | Fiorentino | 264/60 X |
| 4,615,987 | 10/1986 | Chyung | 501/32 |

*Primary Examiner*—Kenneth M. Schor
*Attorney, Agent, or Firm*—Clinton S. Janes, Jr.

[57] ABSTRACT

The present invention is directed to the preparation of hybrid composite bodies composed of an essentially alkali-free, alkaline earth aluminosilicate glass matrix reinforced with SiC whiskers and continuous ceramic fibers.

3 Claims, No Drawings

PROVIDING REINFORCED ALKALINE EARTH ALUMINOSILICATE GLASSES

This application is a continuation of application Ser. No. 904,472, filed Sept. 8, 1986, now abandoned, which is a division of application Ser. No. 723,634, filed Apr. 15, 1985, now U.S. Pat. No. 4,626,515.

BACKGROUND OF THE INVENTION

The use of inorganic fibers and whiskers to reinforce such matrices as glasses, glass-ceramics, sintered ceramics, organic plastics, and various metals is well known. Fibers and whiskers have been commonly distinguished upon the basis of their microstructure. Thus, whiskers have generally been defined as elongated, single-crystal fibers. Hence, whiskers have typically been described as having a thickness less than about 100 microns with a length-to-diameter ratio of at least 10. In contrast, fibers are customarily considered to be multicrystalline or amorphous.

Because of their intrinsic shape, high modulus of elasticity, and high tensile strength, inorganic whiskers of different compositions can be implanted in various matrices to produce composite products exhibiting superior strength-to-weight and stiffness-to-weight characteristics. To illustrate, whiskers prepared from very stiff, low density covalent compounds such as carbides, nitrides, and oxides can demonstrate elastic moduli greater than most metals and are often much stronger than steel, when viewed in proportion to their weight.

Much study has been reported in the scientific literature to comprehend the fundamental mechanism underlying the strengthening improvement to composite articles imparted through the presence of fibers therein. As a result of that study, it has been generally agreed that the mechanism operating involves a load transfer by the matrix to the fibers through shear; that load transfer taking place near the ends of the fibers within a distance of a few fiber diameters.

A like strengthening mechanism has been postulated to be operating in whisker-containing composites, but the extent of the load transferred by the matrix to the whiskers is a function of the length and aspect ratio of the whisker. As a consequence, a whisker may not be loaded to its breaking stress such that full advantage cannot be taken of its reinforcing capability. In addition to the factors of length and aspect ratio of a whisker, orientation of a whisker with respect to applied stress and stress concentrations at the ends of the whiskers results in lower strength improvement than is possible with fibers. Therefore, whisker reinforced composites will normally exhibit lower mechanical properties than unidirectionally-oriented, continuous fiber reinforced composites prepared from like components (when properties are determined along the fiber axis). Whisker-containing composites possess one substantive advantage over the continuous fiber-containing composites, however, in that they are macroscopically isotropic.

U.S. Pat. No. 4,464,192 discloses the preparation of reinforced composite articles consisting of whiskers or chopped fibers embedded in a glass matrix. The patent describes in some detail the production, through injection molding, of composite articles consisting of chopped fibers (<0.75" in length with an average diameter of ~5–50 microns) of alumina, graphite, silicon carbide, and/or silicon nitride dispersed within a matrix of a high silica glass, or a borosilicate glass, or an aluminosilicate glass. As a specific example of a high silica glass, the patent cites Corning 7930, a glass containing about 96% $SiO_2$ marketed by Corning Glass Works, Corning, N.Y. under the trademark VYCOR; as a specific example of a borosilicate glass, the patent cites Corning 7740, marketed by Corning Glass Works under the trademark PYREX; and as a specific example of an aluminosilicate glass, the patent cites Corning 1723, an alkaline earth aluminosilicate glass marketed by Corning Glass Works.

The patent observes that a mixture of glass powder and chopped fibers or whiskers may be injected directly into a mold. However, the preferred forming method comprises the following steps:
(a) admixing a polymeric binder, glass powder, chopped fibers, and a carrier liquid;
(b) drying the mixture;
(c) cold pressing the mixture to less than its original volume;
(d) heating the pressed mixture to eliminate the carrier liquid and binder;
(e) hot pressing the mixture to form a billet of a desired density;
(f) placing the billet in an injection molding apparatus;
(g) heating the billet to the softening point of the glass; and
(h) injecting the softened billet into a preheated mold having the desired internal configuration.

The preferred carrier liquid is water and the preferred binder is a polymeric wax. The fibers comprise about 15–50% by volume of the final composite body.

U.S. Pat. No. 4,263,367 discloses the production of reinforced composite articles consisting of discontinuous graphite fibers (average length ~0.75") embedded in a glass matrix. The single specific glass referred to in the patent was Corning 7740. In the preferred embodiment of the method to prepare such bodies, plies of graphite paper were either dipped in a slurry of powdered glass and then stacked, or simply stacked with layers of powdered glass between each ply of paper, and the as-formed articles hot pressed to form composite articles. The fibers comprised about 20–50% by volume of the articles.

U.S. Pat. No. 4,314,852 discloses the fabrication of reinforced composite articles consisting of continuous SiC fibers embedded in a glass matrix, the glass being selected from the group of high silica glass, borosilicate glass, and aluminosilicate glass. In like manner to U.S. Pat. No. 4,464,192 above, Corning 7930 comprised the high silica glass, Corning 7740 comprised the borosilicate glass and Corning 1723 comprised the aluminosilicate glass.

The method provided for producing such articles involved the following steps:
(a) a tow of fibers from a spool was passed through a slurry of powdered glass to impregnate the tow;
(b) the impregnated fibers were re-wound onto a larger spool in such a manner to form a tape;
(c) the tape was dried, removed from the receiving spool, and cut into strips to conform to the dimensions of the article desired;
(d) the strips were laid up in a mold; and then
(e) hot pressed to form a composite body.

The fiber content comprised about 30–70% by volume of the final product.

SUMMARY OF THE INVENTION

We have found that articles, termed hybrid composites, containing both SiC whiskers and SiC fibers embedded in preferably alkali-free, alkaline earth aluminosilicate glass matrices can be fabricated which exhibit quite unexpected mechanical properties in that they are very different from such properties demonstrated by composites containing only whiskers or containing only fibers, and do not comprise an average of those two sets of properties. Most significantly, whereas microcrack yield stress cannot be measured on whisker-reinforced composites because the length of the whiskers is too short to prevent such composites from fracturing in like manner to monolithic glass bodies, the inclusion of whiskers in fiber-containing composites raises the matrix microcracking strain very substantially. The microcrack yield stress (MCY) is the flexural stress on the composite when the glass matrix begins to microcrack as a result of the fact that the elongation strain of the fibers is much higher than that of the matrix (~1.5% vs. 0.1%). After the MCY point is passed, the share of the load increases on the fibers at the same time that the Young's modulus of the matrix is decreasing. Stated in another way, the MCY point constitutes the stress where the stress-strain curve becomes non-linear. At the ultimate stress or modulus of rupture value, the fibers carry all of the load. The very substantial improvement in microcrack strain and stress provided through the inclusion of whiskers is of great practical importance since it has been postulated that the microcrack stress-strain point may comprise the design limit for composites. Also, the transverse strength of the composites (corresponding to fractures running parallel to the continuous fibers) is markedly increased, thereby significantly reducing fatigue and delamination effects.

Inasmuch as SiC whiskers are so small in cross section, but exhibit a high aspect ratio, they are customarily received from a supplier in agglomerated form. Because the presence of whisker agglomerates in a composite body leads to improper consolidation of the body with consequent weak areas therein, it is normally necessary to break up the agglomerates to provide a uniform dispersion of the whiskers in the matrix body. U.S. Pat. No. 4,463,058 discloses one technique for deagglomerating SiC whiskers which comprises the steps of:

(a) forming a slurry of the whiskers utilizing a polar carrier liquid;
(b) stirring the slurry; and
(c) ballmilling the slurry.

Thereafter, the matrix material was blended into the slurry and that mixture dried.

We have found the use of a shear mixer to be even more rapid and effective in breaking up agglomerates of whiskers and uniformly dispersing them in a matrix material. Thus, a slurry of whiskers in a polar liquid can be blended for a few minutes in a shear mixer; a predetermined amount of matrix material added; the mixing continued for a few minutes; and the mixture dried or otherwise prepared for a shaping process.

SiC whiskers (or less desirably chopped SiC fibers) can be employed in conjunction with various kinds of continuous, i.e., non-chopped, ceramic fibers, e.g., $Si_3N_4$, graphite, $B_4C$, BN, $ZrO_2$, zircon, mullite, spinel, or alumina, to produce reinforced composite articles, but continuous (non-chopped) SiC fibers are much preferred. Also, whereas the combination of whiskers and continuous fibers produces a reinforcing effect in different glass compositions, the greatest improvement in microcrack yield stress resulting therefrom appears to be found in alkali-free alkaline earth aluminosilicate glass matrices. Typically, the whisker contents will range about 5-60% by weight and loadings of continuous fibers will range about 15-70% by volume, with the total of whiskers + fibers not exceeding about 70% by weight. Where graphite fibers comprise the continuous ceramic fibers, a minor amount of alkali metal oxide may be tolerated.

In the broadest terms, the inventive composite bodies can be prepared by means of the following steps:

(a) SiC whiskers are blended into a glass powder as described above;
(b) that mixture combined with continuous (non-chopped) ceramic fibers to form oriented prepregs;
(c) the prepregs are stacked in a desired sequence of ply orientations; and
(d) the stacked prepregs are fired at an elevated temperature to consolidate the stack into an integral body. (Customarily, the stack will be hot pressed or isostatically pressed to insure the production of void-free bodies.)

The prepregs will commonly be fired at temperatures up to that at which the glass matrix exhibits a viscosity of $\sim 10^2$ poises with pressures of about 1000-3000 psi generally being applied over the sintering range of the matrix; that range beginning at about the annealing point of the glass ($10^{13}$ poises) and extending up to about the $10^2$ poise viscosity. As can be appreciated, higher pressing loads are required at lower temperatures where the viscosity of the glass matrix is higher.

Where a composite article containing discontinuous SiC fibers is desired, the preferred embodiment contemplates the use of SiC paper. Thus, the fibers can be chopped to paper length (~0.75") through conventional means and formed into sheets via known papermaking techniques. The papers may either be dipped into a slurry of glass and stacked in combination with continuous (non-chopped) ceramic fibers to form oriented prepregs, or the papers stacked with layers of powdered glass between each ply and combined with continuous ceramic fibers to form oriented prepregs.

RELATED APPLICATION

U.S Application Ser. No. 723,572, filed concurrently herewith in the names of K. Chyung, R. F. Cooper, K. Gadkaree, R. L. Stewart, and M. P. Taylor under the title of REINFORCEMENT OF ALKALINE EARTH ALUMINOSILICATE GLASS-CERAMICS, now U.S. Pat. No. 4,615,987, discloses the production of composite glass-ceramic articles containing an alkaline earth aluminosilicate as the predominant crystal phase which are reinforced through the dispersion therein of SiC whiskers, continuous ceramic fibers, or a combination of SiC whiskers and continuous ceramic fibers.

DESCRIPTION OF PREFERRED EMBODIMENTS

Table I records the approximate compositions, expressed in terms of weight percent on the oxide basis, of a group of glasses marketed by Corning Glass Works.

TABLE I

|  | Corning 1723 | Corning 7052 | Corning 7740 | Corning 0080 |
|---|---|---|---|---|
| $SiO_2$ | 57.0 | 64.0 | 81.0 | 73.0 |

TABLE I-continued

|  | Corning 1723 | Corning 7052 | Corning 7740 | Corning 0080 |
| --- | --- | --- | --- | --- |
| $B_2O_3$ | 4.0 | 19.0 | 13.0 | — |
| $Al_2O_3$ | 16.0 | 8.0 | 2.0 | 1.0 |
| BaO | 6.0 | 3.0 | — | — |
| $Na_2O$ | — | 2.0 | 4.0 | 17.0 |
| $K_2O$ | — | 3.0 | — | — |
| $Li_2O$ | — | 1.0 | — | — |
| CaO | 10.0 | — | — | 5.0 |
| MgO | 7.0 | — | — | 4.0 |
| F | — | 1.0 | — | — |

As can be observed, Corning 1723 is essentially an alkaline earth aluminosilicate glass free from alkali metal oxides; Corning 7052 is essentially an alkali aluminoborosilicate glass; Corning 7740 is essentially an alkali borosilicate glass; and Corning 0080 is essentially an alkali, alkaline earth silicate glass. The glasses were comminuted to particles having an average particle size less than about 10 microns. To insure the absence of any tramp large particles, the frit was screened through a No. 100 U.S. Standard Sieve (149 microns).

To a solution consisting of 50 ml isopropanol and 150 ml distilled water in a Waring blender were added 3 grams SiC whiskers and the blender energized for five minutes to deagglomerate the whiskers and develop a uniform suspension. The SiC whiskers exhibited diameters of about 1 micron or somewhat less and lengths of about 40-50 microns. Seven grams of the above glass powders were added to the mixture and the mixing continued for another five minutes. The slurry was thereafter vacuum-filtered utilizing a Buechner funnel. That sequence of steps was repeated several times to secure a composite filter cake which was dried and then hot pressed in a non-oxidizing atmosphere in a graphite mold having molybdenum metal liners. This practice allows the whisker-glass ratio and the water-isopropanol ratio to be varied as desired. Furthermore, as will be understood, polar liquids other than water may be used but to no substantive advantage.

As has been observed above, a range of temperatures and pressures can be operable in conventional hot pressing procedures; it being recognized that the forming process will be undertaken at temperatures at which the glass frit manifests a viscosity between about $10^2$–$10^{13}$ poises.

Table II reports the weight percent of whiskers (Whisk) in each glass matrix, the times (in minutes), temperatures (° C.), and loads (in psi) utilized in the hot pressing operation; the modulus of rupture (MOR), expressed in terms of Ksi (1000 psi), as measured on standard bars employing the conventional four point bend procedure, flexural modulus in bending (Mod), expressed in terms of $10^6$ psi, and the fracture toughness ($K_{IC}$), expressed in terms of $MPam^{\frac{1}{2}}$, as measured on single edge notched beams in four point loading in the conventional manner. The viscosity (Visc) of the glass at the pressing temperature is also recorded in terms of poises (p).

TABLE II

| Glass | Pressing Conditions | | | | | | Properties | | |
| --- | --- | --- | --- | --- | --- | --- | --- | --- | --- |
|  | Whisk | Time | Temp. | Visc. | Load | MOR | $K_{IC}$ | Mod. |
| 1723 | 50 | 10 | 948° | $10^7$p | 1000 | 14.0 | — | — |
| 1723 | 50 | 10 | 1093° | $10^5$p | 1000 | 14.7 | — | — |
| 1723 | 50 | 10 | 1330° | $10^3$p | 1000 | 21.7 | — | — |
| 1723 | 40 | 10 | 1093° | $10^5$p | 1000 | 31.2 | — | — |
| 1723 | 40 | 10 | 1330° | $10^3$p | 1000 | 35.6 | — | — |
| 1723 | 40 | 30 | 1400° | 400p | 1500 | 47.5 | 5.1 | — |
| 1723 | 30 | 10 | 1192° | $10^4$p | 1000 | 36.5 | — | — |
| 1723 | 30 | 10 | 1330° | $10^3$p | 1000 | 49.0 | 3.4 | 20.6 |
| 7052 | 30 | 10 | 1365° | $10^3$p | 1000 | 35.0 | 2.4 | 15.6 |
| 7740 | 30 | 10 | 1515° | $10^3$p | 1000 | 28.2 | 2.2 | 13.4 |
| 0080 | 30 | 10 | 1193° | $10^3$p | 1000 | 26.0 | 2.4 | 14.0 |

As can readily be observed from Table II, the pressing conditions strongly affect the mechanical properties exhibited by the final product. Hence, to insure complete sintering (consolidation) to an integral void-free body, a balance must be drawn with respect to the time, temperature, and pressure applied. Thus, at lower temperatures, i.e., at higher glass viscosities, longer times and greater loads will be required. Scanning electron micrographs of the 30% whisker composite of Corning 1723 showed full consolidation at 1330° C.($10^3$ poises), whereas the 40% whisker composite of Corning 1723 evidenced some residual porosity even when processed at 1400° C. (400 poises). It is quite apparent, however, that the mechanical properties demonstrated by the Corning 1723 composites are superior to those displayed by the other matrices.

Various means for forming continuous fiber reinforced glass and ceramic composite articles have been described in the prior art. The most preferred method for preparing such articles, however, has contemplated hot pressing or hot isostatically pressing prepregs and has involved the following general protocol:

(a) continuously unwinding a roll of continuous fiber, paper, fabric, or yarn from a spool through a slurry of powdered glass containing an organic binder to impregnate the fibers;

(b) removing excess slurry from the fibers, (c) wrapping the impregnated fibers around a rotating drum to produce flat sheets (prepregs) wherein the fibers are held by the organic binder;

(d) cutting the prepregs to conform to the lateral dimensions of the article to be formed;

(e) stacking the cut prepregs to a height to yield the vertical dimensions of the article to be fabricated; (the lay up of the plies of prepregs may be varied in direction to produce different mechanical properties.)

(f) heating the stacked prepregs in an oxidizing atmosphere to burn out the organic binder, typically at temperatures about 300°–500° C.; and (g) consolidating the stacked prepregs into an integral body in a non-oxidizing atmosphere.

In general accordance with the above steps, a slurry of powder in a 92.5 weight percent isopropyl alcohol/7.5 weight percent water solution was prepared and about 6% by weight polyvinyl acetate was admixed to provide a binder system. A yarn of continuous SiC fiber was run through an oxidizing flame to burn off the organic sizing agent thereof and thereafter passed through the above slurry to pick up the glass powder. After removing excess slurry, the yarn was wound around a rotating drum in a manner to form a sheet (prepreg) having unidirectional fiber orientation; the fibers being bonded together by means of the polyvinyl acetate binder.

The prepreg was dried at room temperature and discs having a diameter of about 3" were cut therefrom. The discs were stacked in a steel tray in a uniaxial orientation and the tray inserted into an oven operating at 450° C. and maintained therein for two hours in an atmosphere of flowing air to vaporize off the organic components.

The stack of prepreg plies was subsequently introduced into a graphite mold having a molybdenum lining and the mold transferred to a resistance-heated press capable of operating in the presence of a controlled atmosphere. The stack of plies was consolidated by pressing for the time, temperature, and load reported in Table III in an atmosphere of flowing nitrogen. The fiber content of the composite ranged about 30–35% by volume.

Table III records the time (in minutes), temperature (° C.), viscosity of the glass at that temperature in poises (p), and load (in psi) employed in the hot pressing operation; and modulus of rupture (MOR), expressed in terms of Ksi (1000 psi), flexural modulus (Mod), expressed in terms of $10^6$ psi, and microcrack yield stress (MCY), expressed in terms of Ksi.

TABLE III

| Processing Conditions | | | | | Properties | | |
|---|---|---|---|---|---|---|---|
| Glass | Time | Temp. | Visc. | Load | MOR | Mod | MCY |
| 1723 | 10 | 1093° C. | $10^5$ | 1000 | 176 | 13.9 | 39 |

A comparison of Table III with Table II illustrates that the presence of continuous fibers provides a composite of higher modulus of rupture and one which exhibits a microcrack yield stress point, but one which demonstrates a lower flexural modulus. Also, the values measured on the composites prepared with a Corning 1723 matrix were consistently higher than those determined on the articles prepared from the other glass matrices.

In order to investigate the possibility of preparing hybrid composite bodies reinforced through the inclusion of both whiskers and continuous (non-chopped) fibers, a homogeneous suspension containing 20% by weight SiC whiskers was prepared from glass powder, utilizing the above-described shear mixing technique. After exposure to an oxidizing flame, a yarn of continuous SiC fiber was passed through that slurry to pick up the glass powder and whiskers and, after removing excess slurry, wound onto a mandrel to form a prepreg demonstrating unidirectional fiber orientation. The prepreg was dried at room temperature and discs having a diameter of about 3" were cut therefrom. The discs were stacked in a steel tray in a uniaxial orientation and the organic components burned off as described. Thereafter, the stack of prepreg plies was consolidated into an integral hybrid composite body in a non-oxidizing atmosphere by pressing for the time, temperature, and load listed in Table IV. The fiber content of the composite ranged about 30–35% by volume.

Table IV presents the time (in minutes), temperature (° C.), viscosity of the glass at that temperature in poises (p), and load (in psi) utilized in the hot pressing process. Table IV also sets out measurements of modulus of rupture (MOR), expressed in terms of Ksi, flexural modulus in bending (Mod), expressed in terms of $10^6$ psi, and microcrack yield stress (MCY), expressed in terms of Ksi.

TABLE IV

| Processing Conditions | | | | | Properties | | |
|---|---|---|---|---|---|---|---|
| Glass | Time | Temp. | Visc. | Load | MOR | Mod. | MCY |
| 1723 | 10 | 1093° | $10^5$ | 1000 | 136 | 17.2 | 72 |

A comparison of Table IV with Table III illustrates the tremendous improvement in microcrack yield stress imparted through the presence of whiskers in the Corning 1723 matrix.

Whereas the above description of hybrid composite bodies utilized continuous SiC fibers (and the use of such fibers constitutes the most preferred inventive embodiment), it will be appreciated, as was explained above, that other ceramic fibers can be employed in like manner. Examples of such fibers include SiC, BN, $B_4C$, $ZrO_2$, zircon, graphite, mullite, spinel, and alumina.

We claim:

1. A method for making a glass matrix reinforced with SiC whisker and continuous, non-chopped, ceramic fiber, the reinforced glass matrix being a hybrid composite body consisting essentially of about 5–60% by weight deagglomerated SiC whiskers having a thickness less than 100 microns with a length-to-diameter ratio of at least 10 and about 15–70% by volume continuous, unchopped, ceramic fibers substantially uniformly distributed in a glass matrix, the total content of whiskers and fibers not exceeding about 70% by weight comprising the steps of:
   (a) melting a batch for an alkali free, alkaline earth aluminosilicate glass;
   (b) cooling the melt to form a glass body;
   (c) comminuting said glass body to a fine glass powder;
   (d) coating said SiC whiskers and said continuous, non-chopped, ceramic fibers with said glass powder;
   (e) forming a mixture of said glass-powder-coated SiC whiskers and glass-powder-coated continuous, non-chopped, ceramic fibers into a shaped composite of a desired configuration;
   (f) consolidating said shaped composite into an integral body by heating the shaped composite to a temperature at which the glass of said glass powder exhibits a viscosity between $10^2$–$10^{13}$ poises, and then
   (g) cooling said integral body to thereby form said reinforced glass matrix composite body.

2. A method according to claim 1 wherein said continuous, non-chopped, ceramic fibers are selected from the group consisting of SiC, graphite, BN, $B_4C$, $ZrO_2$, mullite, spinel, and alumina.

3. A method according to claim 1 wherein said glass matrix consists essentially, expressed in terms of weight percent on the oxide basis, of about:

| | | | |
|---|---|---|---|
| $SiO_2$ | 57.0 | BaO | 6.0 |
| $B_2O_3$ | 4.0 | CaO | 10.0 |
| $Al_2O_3$ | 16.0 | MgO | 7.0 |

* * * * *